US006105931A

United States Patent [19]

Frank et al.

[11] Patent Number: 6,105,931

[45] Date of Patent: Aug. 22, 2000

[54] WEAR-RESISTANT VALVE APPARATUS

[75] Inventors: Dieter Frank; Sigfried Höfler, both of Hannover; Henning Kutzner, Elze, all of Germany

[73] Assignee: WABCO GmbH, Hannover, Germany

[21] Appl. No.: 09/112,088

[22] Filed: Jul. 9, 1998

[30] Foreign Application Priority Data

Jul. 5, 1997 [DE] Germany ........................... 197 30 276

[51] Int. Cl.[7] ........................................ F16K 31/06

[52] U.S. Cl. .................. 251/129.15; 251/64; 251/129.21

[58] Field of Search ................................ 251/129.15, 64, 251/359, 129.01, 129.21

[56] References Cited

U.S. PATENT DOCUMENTS

| | | | |
|---|---|---|---|
| 2,860,850 | 11/1958 | Rhodes . | |
| 3,877,478 | 4/1975 | Longworth | 251/65 X |
| 4,678,160 | 7/1987 | Yamada et al. | 251/129.16 X |
| 4,826,132 | 5/1989 | Moldenhauer . | |
| 4,917,351 | 4/1990 | Lindbloom et al. | 251/129.15 X |
| 5,064,169 | 11/1991 | Alberts et al. . | |
| 5,267,721 | 12/1993 | Stroh | 251/121 |
| 5,375,813 | 12/1994 | Rozinsky | 251/360 X |
| 5,707,039 | 1/1998 | Hamilton et al | 251/129.15 X |
| 5,878,991 | 3/1999 | Krimmer et al. | 251/64 |
| 6,019,344 | 2/2000 | Engel et al. | 251/64 |

FOREIGN PATENT DOCUMENTS

| | | |
|---|---|---|
| 0397058 | 11/1990 | European Pat. Off. . |
| GM 6603718 | 10/1967 | Germany . |
| 3502730A1 | 7/1986 | Germany . |
| 3823569A1 | 1/1990 | Germany . |
| 4201449C2 | 7/1993 | Germany . |
| 19600275A1 | 7/1997 | Germany . |
| 19700495A1 | 7/1997 | Germany . |
| 04000079 | 1/1992 | Japan . |
| 2124342 | 2/1984 | United Kingdom . |
| 2278906 | 12/1994 | United Kingdom . |

*Primary Examiner*—Kevin Lee
*Attorney, Agent, or Firm*—Proskauer Rose LLP

[57] ABSTRACT

A wear-resistant valve, having at least two parts which move relative to each other, and which impact against each other, avoids damage to the contacting parts over long operating periods, with very little additional space requirement, and at low cost. At least one of the impact surfaces is covered with a thin coating. The material used for the coating is plastic, in particular, a fluorine-containing polymer material, such as polytetrafluoroethylene. The valve closing element, whose valve closing surface makes contact with a valve seat when the valve is actuated, is preferably provided with the coating. Valve arrangements which are actuated electromagnetically by a pulsing electrical signal are preferred areas of application for the present invention.

14 Claims, 3 Drawing Sheets

9 2 15 15 17 17 22 8 7 4 4a 3a 3 5 5 16 16 6 6a 6 6a 14 10 18 11 13 1 12 12

WEAR-RESISTANT VALVE APPARATUS

FIELD OF THE INVENTION

The present invention relates to an apparatus with at least two parts capable of being moved relative to each other, and which have contact with each other as a result of their relative movement. More particularly, the present invention relates to a valve apparatus with wear-resistant movable parts.

BACKGROUND OF THE INVENTION

A typical prior art valve apparatus contains a magnetic armature which actuates a closing element. The magnetic armature is located in a guiding sleeve surrounded by a magnetic coil, and is capable of displacement therein. The magnetic armature is provided with a plastic coating to improve the gliding quality on the part of the surface which is in contact with the guiding sleeve.

In addition to improving the gliding quality of the moving part within the non-moving part, it is also necessary in such valve arrangements to attenuate the impact of the moving part on the non-moving part. Thereby, damage of these parts, which are normally made of relatively hard materials, can be avoided.

Therefore, when designing an apparatus with at least two parts capable of moving relative to each other, and which may have contact with each other as a result of their relative movement, it is necessary to avoid damage to these parts. For this purpose, prior art devices contain springy attenuating means, e.g., being made of rubber, being installed between the moving parts.

However, this type of prior art attenuating means requires a relatively large space in order to produce effective attenuation over a long period of life. In many installations though, and especially in newer valve installations, only a small amount of space is available.

To provide the large space required to install the aforementioned prior art attenuating means would also necessitate a lengthening of the stroke of the magnetic armature, as required for faultless functioning of the valve arrangement. In addition, to actuate such a valve arrangement, a large amount of magnetic force would be necessary. This could be achieved, for example, by means of a relatively large magnetic coil and a relatively strong actuating current. However, it is not desirable to enlarge the magnetic coil or to increase the power consumption.

It is therefore an object of the present invention to provide an apparatus, e.g., a valve arrangement, having at least two movable parts which may have contact with each other, with an attenuating means which not only avoids damage to the movable parts, but which also requires very little additional space.

SUMMARY OF THE INVENTION

An advantage of the present invention is that damage to the movable parts is avoided with little expenditure, even for long operating periods, or with a great number of impacts, by using a thin plastic coating material as the attenuating means, whereby the movable parts can be manufactured at reasonable cost.

In an advantageous further development of the present invention, the parts which are movable relative to each other have a lower specific elasticity than the plastic coating in the area of their impact surfaces. This has the advantage that a large number of materials can be used for the movable parts. Therefore, the material best suited for its performance and cost considerations can be selected for every application.

In particular, when the inventive apparatus is in the form of a valve arrangement actuated by a solenoid, as shall be explained in further detail below, the above-described freedom of selection for the materials offers the particular advantage that magnetically conductive materials can also be used. In an advantageous embodiment, a low-retentivity material, preferably steel, is used.

In another advantageous further development of the present invention, the material used for the coating is a fluorine-containing polymer material, preferably polytetrafluoroethylene (also called Teflon™). In this manner, it is particularly convenient to provide the coating for the parts to be coated, e.g., by dipping them into a coating material.

In another advantageous further development of the present invention, the movement of at least one of the parts capable of movement is guided by a guiding device. The contact surfaces of the part guided by the guiding device are also covered, at least in part, with the plastic coating. As a result, the friction between the guiding device and the part being guided therein can be reduced, so that the parts are moved more easily. Furthermore, the wear of these parts due to friction is reduced. In addition, idle times, which may be caused by the effect of friction when the guided movable part changes direction, can be reduced.

In an especially economic and therefore advantageous manner, the part guided in the guiding device can be provided with a coating covering this entire part in one single manufacturing step.

When polytetrafluoroethylene is used as the coating material, an additional advantage is achieved. That is, a nearly identical adhesion and low gliding frictional value, can be obtained with many materials used for the guiding device. Thereby, certain slip-stick effects, which are known in the valve arrangement art, can be avoided. Another advantage of using polytetrafluoroethylene is that manufacturing tolerances of the frictional values are very low as compared to other coating materials. Therefore, a nearly uniform friction behavior can be achieved in large production runs without additional expenditure.

In an advantageous embodiment of the present invention, the apparatus is configured in the form of a valve arrangement, in which one of the parts capable of movement, relative to another, is provided with a valve seat, while the other part is configured in the form of a valve closing element, with a valve closing surface. When the valve arrangement is actuated, the valve closing element comes into contact with certain parts of the valve arrangement. Therefore, the valve closing element, and/or the parts of the valve arrangement, are advantageously provided at least in part with the plastic coating.

In particular, the valve seat and the valve closing surface, which are associated with each other and serve to close the valve, have areas in which these parts impact against each other and which are therefore provided with the plastic coating as attenuating means.

In an advantageous embodiment, the valve arrangement has a solenoid consisting of at least a coil, a core, and an armature, to actuate the movement of the movable parts. The armature is advantageously configured in the form of a valve closing element. In addition, the valve seat can be made in one piece with the core of the solenoid. Thereby, an especially compact and economical construction of the valve arrangement is achieved.

In addition, the inventive solenoid may be provided with a yoke through which the magnetic flow is moved from core to armature, in order to improve the degree of effectiveness of the valve arrangement. Thereby, the power consumption of the valve arrangement can be reduced.

In accordance with an illustrative embodiment of the present invention, an apparatus, such as a valve arrangement, has at least two parts capable of being moved relative to each other, and which impact against each other as a result of their relative movement towards each other. A thin plastic coating, such as polytetrafluoroethylene, is used to cover, at least partially, the impact surface on at least one of the parts having motion relative to the other. Moreover, the parts which are capable of being moved relative to each other, may have a lower specific elasticity (E module) in the vicinity of their impact surfaces than that of the plastic coating. Typically, the plastic coating has a thickness of less than 30 μm and more than 5 μm.

Illustrative embodiments of the present invention are more fully described below in conjunction with the following drawings.

BRIEF DESCRIPTION OF THE DRAWINGS

In FIGS. 1–3, the same reference numbers are used for the same parts.

DETAILED DESCRIPTION OF THE INVENTION

Figure 1:
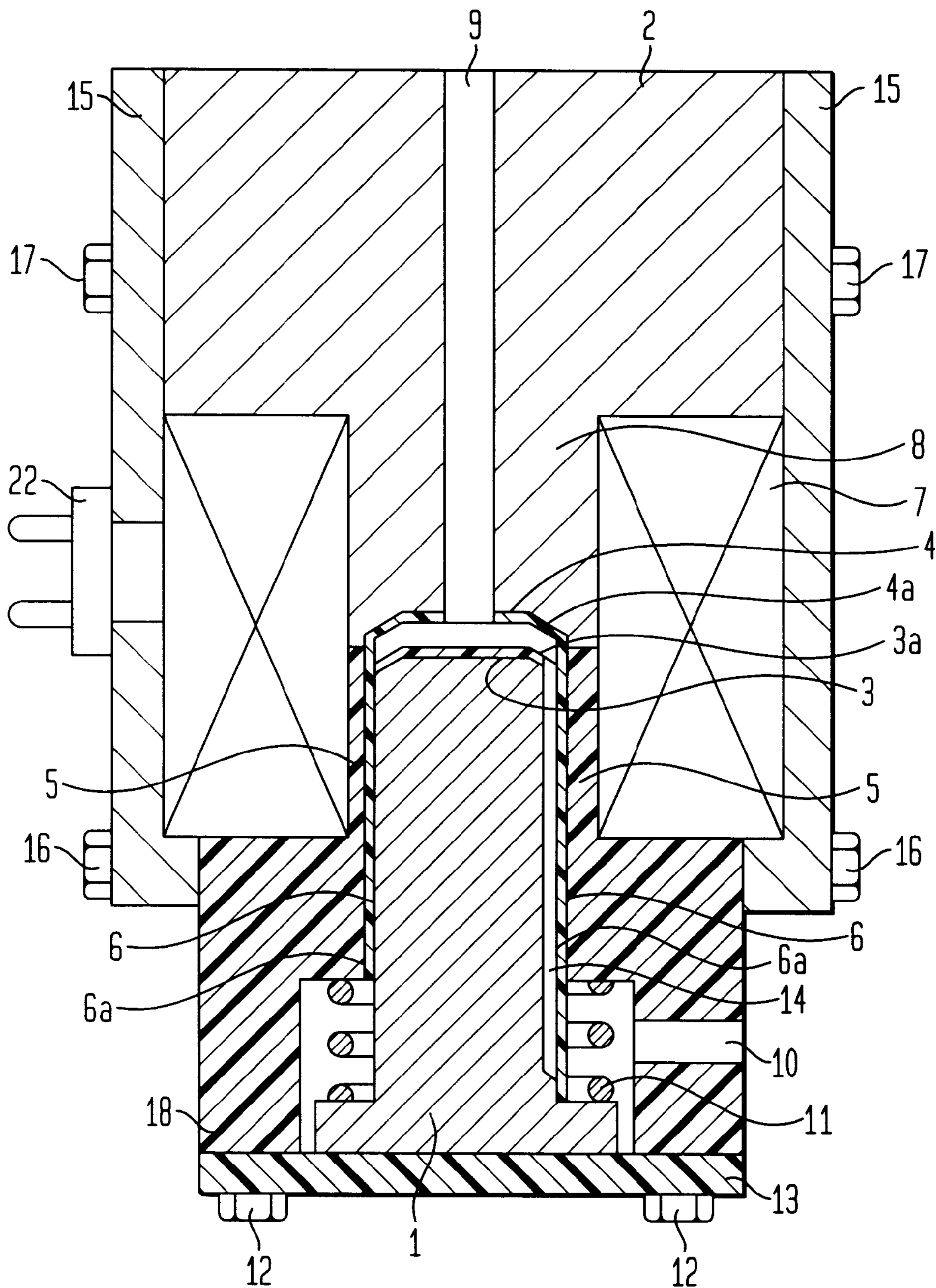
FIG. 1 shows a valve arrangement, in an embodiment of the present invention, as a 2/2-way valve in a sectional representation.
Figure 2:
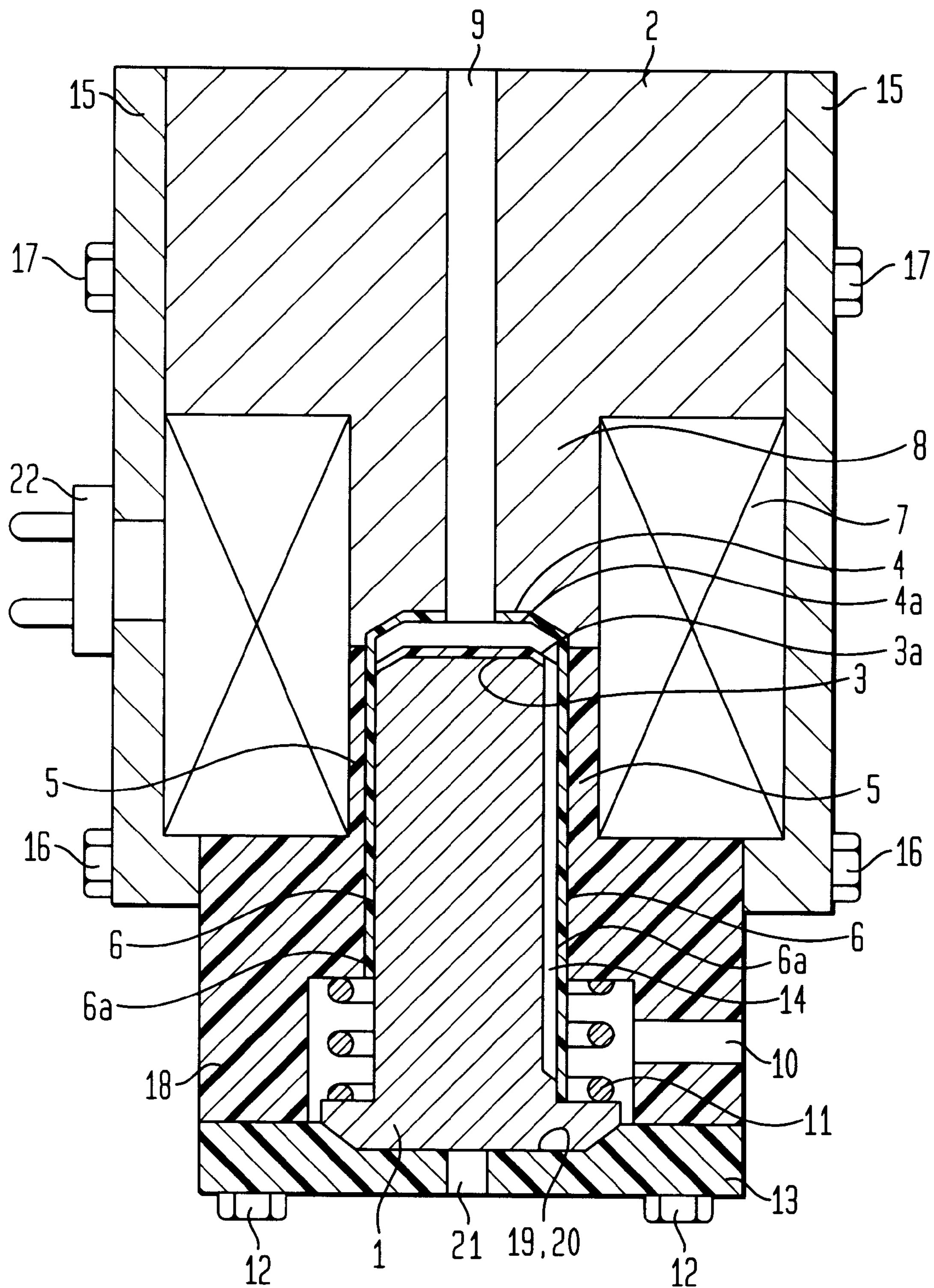
FIG. 2 shows a valve arrangement, in another embodiment of the present invention, as a 3/2-way valve in a sectional representation.
Figure 3:
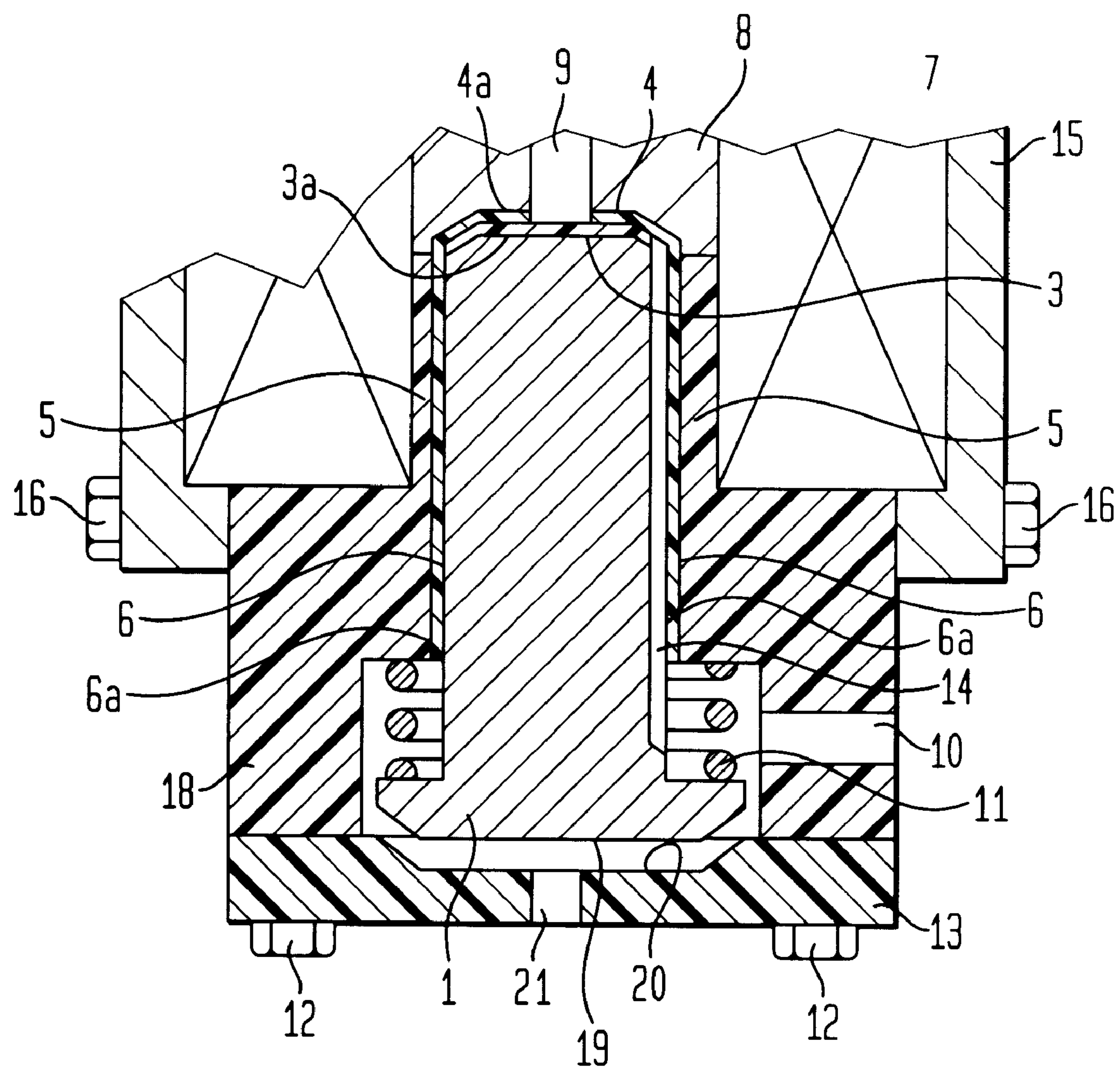
FIG. 3 shows a detail of the valve arrangement of FIG. 2 in an actuated state.

The valve arrangement embodiments shown in FIGS. 1–3 serve to control a stream of pressure fluid as a function of an electrical signal. The embodiment shown in FIG. 1 is used to switch the pressure fluid stream on and off in one single flow path. The embodiment shown in FIGS. 2 and 3 serves to switch over the pressure fluid stream between two flow paths. The pressure fluid in this case may be compressed air, for example. The electrical signal used may be an electric current, which is switched on and off in accordance with a predetermined time function, in the manner of a digital signal.

In FIG. 1, the valve arrangement has a valve housing consisting of parts (2, 13, 15, 18), which are connected to each other by means of screws (12, 16, 17). The housing parts (2, 13, 15 and 18, respectively) are connected to each other in a pressure-sealed manner. In order to achieve a tight seal, gaskets may be provided on the contact surfaces of these parts, but these are not shown in FIG. 1.

An inlet channel (10) for the pressure fluid is provided in the housing part (18). An outlet channel (9) for the pressure fluid is provided in the housing part (2). Pressure fluid hoses for example, may be connected to these pressure fluid channels (9, 10).

A part (1), which is movable relative to the valve housing, is located in the valve housing (2, 13, 15, 18), and serves on the one hand as a valve closing element to shut off a flow of pressure fluid between the pressure fluid channels (9, 10), and on the other hand, as an armature in a solenoid arrangement which will be described in further detail below. The valve closing element (1) is provided with a pressure fluid channel (14), through which the pressure fluid is able to flow from the inlet channel (10) to the outlet channel (9) in the open state of the valve, as shown in FIG. 1.

In addition to the armature (1), the previously mentioned solenoid arrangement is provided with a core formed by a tapering segment (8) of the housing part (15), with a coil (7), and with a yoke formed by the housing part (15).

The coil (7) is stationary in relation to the valve housing (2, 13, 15, 18), and surrounds the core (8), as well as a tapering segment of the housing part (18). The coil (7) serves as a movement-actuating device of the valve arrangement, and causes a movement of the armature (1) in the direction of the core (8), when a sufficiently strong electrical current is supplied. The coil (7) is made of an electrical conductive wire. To supply the electrical current into the coil (7), an electrical connection element (22), which is connected electrically to the coil (7), is provided at an opening of the housing part (15).

The armature (1) is held in the position shown in FIG. 1 by a spring (11), as long as no current sufficient to overcome the spring force flows in the coil (7). In this state, the valve is open and the pressure fluid is able to flow from the inlet channel (10) to the outlet channel (9).

The housing part (15) serves as a yoke of the solenoid arrangement, and provides a magnetic return path for the magnetic field produced by the coil (7) in the core (8), and in the armature (1). As a result, the power requirement for the actuation of the valve arrangement is reduced, and thus the effectiveness is improved.

The parts (1, 2, 8, 15), which interact magnetically with each other, are made of a magnetically conductive material, e.g., a low-retentivity material, such as steel. The housing parts (13, 18) are made of magnetically non-conductive material, e.g., plastic or brass.

The core (8) is provided with a valve seat (4) on the side towards the armature (1). A valve closing surface (3), which is located on the armature (1), is assigned to the valve seat (4). When a sufficiently strong electrical current is supplied to the coil (7), the armature (1) moves in the direction of the core (8) until the valve closing surface (3) impact against the valve seat (4). After the occurrence of any transient oscillations, the valve closing surface (3) presses against the valve seat (4), and thus prevents pressure fluid from flowing through the pressure fluid channels (9, 10). In this position, the valve is closed.

In the valve-actuation process described above, by activating an electrical current, the valve closing surface (3) and the valve seat (4) serve as impact surfaces. To avoid damage to these impact surfaces, a coating (**3*a*), which is shown greatly exaggerated in thickness, is provided on the valve closing surface (3). The material used for the coating is plastic, which is applied in a relatively thin coat as compared to the dimensions of the armature (1**).

Polytetrafluoroethylene is preferably used as the plastic, which is applied at a layer thickness between 5 and 30 μm. Very little coating material is thus consumed.

This coating may also be applied to the valve seat (4) as coating (**4*a*), also shown greatly exaggerated in thickness. It is, however, advantageous to apply the coating on the valve closing surface (3), and thereby on the armature (1), because the latter is easier to handle during the coating process as a relatively compact single part. Finally, it is also possible to apply a coating on both the armature (1) and on the valve seat (4**).

Either the side of the armature (1) away from the valve closing surface (3), or the surface of the housing part (13)

towards that side, can also be provided with a coating of the type mentioned above, in order to avoid damage when the valve is opened. Such a design is especially advantageous in the case of a valve arrangement with inverse action, i.e., a valve arrangement which is closed when the movement-actuating device is not actuated, i.e., when the coil (7) is without current.

One area (5) of the housing part (18) serves as a guiding device for the movable armature (1). In order to increase the gliding quality of the armature (1) within the guiding device (5), the contact surfaces (6) of these parts are also provided with a coating 5*a* of the type mentioned above. The coating may be applied either on the inside of the guiding device (5), or preferably on the outside of the armature. It is especially economical, e.g., to provide the entire armature (1) with the coating in one working step, e.g., by submerging the armature (1) in the coating material.

In FIG. 2, the embodiment of the valve arrangement is provided with a second outlet channel (21), located in the housing part (13), in addition to the already described parts. Furthermore, a second valve seat (20), which is also located on the housing part (13), is provided, and is assigned a second valve closing surface (19), located on the side of the armature (1) away from the valve closing surface (3). The second valve closing surface (19), in combination with the second valve seat (20), serves to shut off a flow of pressure fluid from the inlet channel (10) to the second outlet channel (21). Thereby, the inlet channel (10) is connected to the outlet channel (9) via the pressure fluid channel (14), when the valve arrangement is in a non-actuated state, as shown in FIG. 2. When the valve arrangement is actuated by feeding an electrical current into the coil (7), the outlet channel (9) is closed off as a result of the movement of the armature (1), and the inlet channel (10) is connected to the second outlet channel (21). This state of the valve arrangement is shown in FIG. 3.

In the embodiment shown in FIGS. 2 and 3, a coating of the type mentioned earlier is preferably applied to the second valve closing surface (19).

The above described embodiments of the invention are intended to be illustrative only. Numerous alternative embodiments may be devised by those skilled in the art without departing from the spirit and scope of the following claims.

What is claimed is:

1. A wear resistant valve, comprising:

a housing part, a movable part, relative to said housing part, a guiding part which guides the movement of said movable part, a valve seat located on to either said housing part or on said movable part, a valve closing surface located on the other of said housing part or said movable part, said valve closing surface facing said valve seat, a movement-actuating part which causes said valve closing surface to impact against said valve seat, wherein when said valve closing surface impacts against said valve seat, said wear-resistant valve is closed, and wherein a plastic coating at least partially covers those areas of said valve seat or said valve closing surface which impact against each other within said wear-resistant valve to attenuate the force of said impact, wherein said wear-resistant valve further comprises a solenoid, said movement-actuating part is the coil of said solenoid, a portion of said housing part is located within said coil, and is the core of said solenoid, said movable part is at least partially located within said coil, and is the armature of said solenoid, and wherein said solenoid coil, said housing part, and said movable part armature are magnetically linked to each other.

2. The wear resistant valve of claim 1, wherein said housing and said movable part have a lower specific elasticity in the vicinity of said areas of said valve seat and said valve closing surface which impact against each other than that of said plastic coating.

3. The wear resistant valve of claim 2, wherein said plastic coating is a fluorine-containing polymer material.

4. The wear-resistant valve of claim 3, wherein said fluorine-containing polymer material is polytetrafluoroethylene.

5. The wear resistant valve of claim 1, wherein any contact surfaces on said housing and said movable part guided by said guiding part are also provided at least in part with said plastic coating.

6. The wear-resistant valve of claim 5, wherein said plastic coating has a thickness of less than 30 $\mu$m.

7. The wear-resistant valve of claim 6, wherein said plastic coating has a thickness of more than 5 $\mu$m.

8. The wear-resistant valve of claim 1, wherein at least one of said housing and said movable part is made of a low-retentivity material.

9. The wear-resistant valve of claim 1, wherein at least part of said coating at least partly covers said valve seat where said valve seat and said valve closing surface impact against each other.

10. The wear-resistant valve of claim 1, wherein at least part of said coating at least partly covers said valve closing surface where said valve seat and said valve closing surface impact against each other.

11. The wear-resistant valve of claim 1, wherein said armature is a valve closing element.

12. The wear-resistant valve of claim 11, wherein said valve seat is made in one piece with said core.

13. The wear-resistant valve of claim 1, further comprising:

a magnetically conductive yoke disposed on the outside of said coil, wherein said coil, said core, said armature, and said yoke are linked magnetically to each other.

14. The wear-resistant valve of claim 8 wherein said low-retentivity material is steel.

* * * * *